United States Patent [19]
de la Haye

[11] Patent Number: 6,056,362
[45] Date of Patent: May 2, 2000

[54] CHAIR ASSEMBLY, IN PARTICULAR A CHAIR ASSEMBLY FOR USE IN VIRTUAL REALITY DEVICES

[75] Inventor: Frans de la Haye, The Hague, Netherlands

[73] Assignee: RPI Advanced Technology Group, Rotterdam, Netherlands

[21] Appl. No.: 09/311,251

[22] Filed: May 13, 1999

Related U.S. Application Data

[63] Continuation of application No. PCT/NL97/00629, Nov. 18, 1997.

[30] Foreign Application Priority Data

Nov. 18, 1996 [NL] Netherlands ............................ 1004551

[51] Int. Cl.[7] .................................................. A47C 1/00
[52] U.S. Cl. .......................... 297/314; 297/325; 297/327; 297/329; 248/394
[58] Field of Search ..................... 297/314, 326, 297/327, 328, 330, 344.16, 344.15, 325, 329; 248/393, 394

[56] References Cited

U.S. PATENT DOCUMENTS

| | | |
|---|---|---|
| 3,628,829 | 12/1971 | Hellig . |
| 4,083,599 | 4/1978 | Gaffney ................................ 297/330 X |
| 4,164,080 | 8/1979 | Kosydar et al. . |
| 4,254,990 | 3/1981 | Kelley ................................... 297/314 X |
| 4,536,029 | 8/1985 | Rogers, Jr. . |
| 4,700,921 | 10/1987 | Holbrook ........................ 297/344.15 X |
| 5,155,873 | 10/1992 | Bridges ................................ 297/330 X |
| 5,485,763 | 1/1996 | Pincus . |
| 5,628,546 | 5/1997 | Boetzkes ............................. 297/330 X |
| 5,678,889 | 10/1997 | Purcell, Jr. ..................... 297/344.16 X |

FOREIGN PATENT DOCUMENTS

621396  5/1927  France ................................... 297/331

*Primary Examiner*—Peter R. Brown
*Attorney, Agent, or Firm*—Hoffmann & Baron, LLP

[57] ABSTRACT

Chair assembly, in particular a chair assembly for use in virtual reality devices, comprising a substructure which comprises a stationary bottom frame and situated above it a top frame bearing a chair, movement means being present between the bottom frame and the top frame, in order to make the top frame move relative to the bottom frame, which movement means comprise drive means and a connecting arm of fixed length which interacts hingedly by way of a top hinge axis with the top frame and hingedly by way of a bottom hinge axis with the bottom frame, wherein the top hinge axis and the bottom hinge axis extend substantially parallel to each other.

6 Claims, 7 Drawing Sheets

CHAIR ASSEMBLY, IN PARTICULAR A CHAIR ASSEMBLY FOR USE IN VIRTUAL REALITY DEVICES

CROSS-REFERENCE TO RELATED APPLICATIONS

This is a continuing application of PCT/NL97/00629 filed Nov. 18, 1997.

FIELD OF THE INVENTION

The invention relates to a chair assembly, in particular a chair assembly for use in virtual reality devices, comprising a substructure which comprises a stationary bottom frame and situated above it a top frame bearing a chair, movement means being present between the bottom frame and the top frame, in order to make the top frame move relative to the bottom frame, which movement means comprise drive means and a connecting arm of fixed length which interacts hingedly by way of a top hinge axis with the top frame and hingedly by way of a bottom hinge axis with the bottom frame.

BACKGROUND OF THE INVENTION

Such a chair assembly is known from U.S. Pat. No. 3,628,829. In the case of this chair assembly the two hinge axes are placed perpendicular to each other, so that only tilting movements of the chair are possible. Moreover, these tilting movements are always jolting movements, since the tilting movements occur about a fixed tilting point situated in the centre underneath the chair. A chair placed on the assembly is therefore also provided with spring elements in the top frame, in order to be able to absorb these jolts.

SUMMARY OF THE INVENTION

The object of the invention is to improve the known chair in such a way that several natural movements to be expected in a virtual reality environment can be imitated therewith substantially without jolts.

This object is achieved according to the invention in the case of a chair assembly of the type mentioned in the preamble, by the fact that the top and bottom hinge axes extend substantially parallel to each other.

In the case of the chair assembly according to the invention, the top frame can perform not only an upward and downward movement, but also a lateral movement and a tilting movement relative to the bottom frame.

Moreover, the movements performed by the top frame relative to the bottom frame will always be smooth, jolt-free movements, and a very uniform rolling motion, for example, can be imitated. It will be clear, however, that jolting movements can also be produced, if necessary.

Reference is also made to U.S. Pat. No. 5,485,763. This document teaches a mechanical apparatus comprising a moveable bottom surface and fixed top surface which are linked by specific linkages which change length as a function of pivot angle. The object however is to provide to the moveable bottom surface the motion or feel of a porch swing.

In a practical embodiment of the chair assembly according to the invention, the movement means comprise two connecting arms, the distance between the top hinge axes of the connecting arms differing from the distance between the bottom hinge axes of the connecting arms.

With the chair assembly according to this embodiment, by choosing the distance between the top hinge axes to be different from that between the bottom hinge axes, a more stable assembly, which can perform movements of a chair present on the assembly in a very reproducible way, can be obtained.

The distance between the top hinge axes is preferably less than the distance between the bottom hinge axes. In this embodiment, the substructure of the chair assembly is more stable.

The use of two connecting arms of fixed length has the major advantage that the top frame with the chair thereon can undergo a tilting movement and also an upward and downward movement with very accurate control.

Although, as will be clear to an expert, the drive means can be selected from many different known drive means, they preferably comprise a linear actuator.

In a special embodiment, the top and bottom hinge axes are situated substantially perpendicular to the transverse direction of the chair. In this embodiment, the top frame with the chair can perform a combined lateral and tilting movement relative to the bottom frame. Moreover, the lateral tilting movement and upward and downward movement can be fairly great, since in a to and fro movement it is not easy for the person seated in such a chair to fall out of the chair.

In a preferred embodiment, the chair is tiltably connected to the top frame, the tilting movement most preferably occurring in a plane extending substantially parallel to the top and bottom hinge axes.

As a result of the combination of the tilting facility of the chair and the movement possibilities of the substructure, a person seated in the chair can be subjected to substantially all movements, varying from tilting, both forwards and backwards and from left to right, but also combined, in combination with upward and downward movements. A major advantage here is that all these movements can occur in a rolling and smooth manner, but jolting movements are possible if necessary.

In a practical embodiment, the chair is tiltably supported in two opposite upright parts of the top frame.

In this embodiment the tilting axes of the chair can be placed at abdomen level of a user, which counters motion sickness.

For performing the tilting movement of the chair relative to the top frame, the chair assembly preferably comprises a linear actuator which is connected between the chair and the substructure.

The invention also provides a substructure obviously intended for use with a chair assembly according to the invention.

Finally, the invention provides a virtual reality device comprising a chair assembly according to the invention.

DESCRIPTION OF THE PREFERRED EMBODIMENTS

Figure 1:
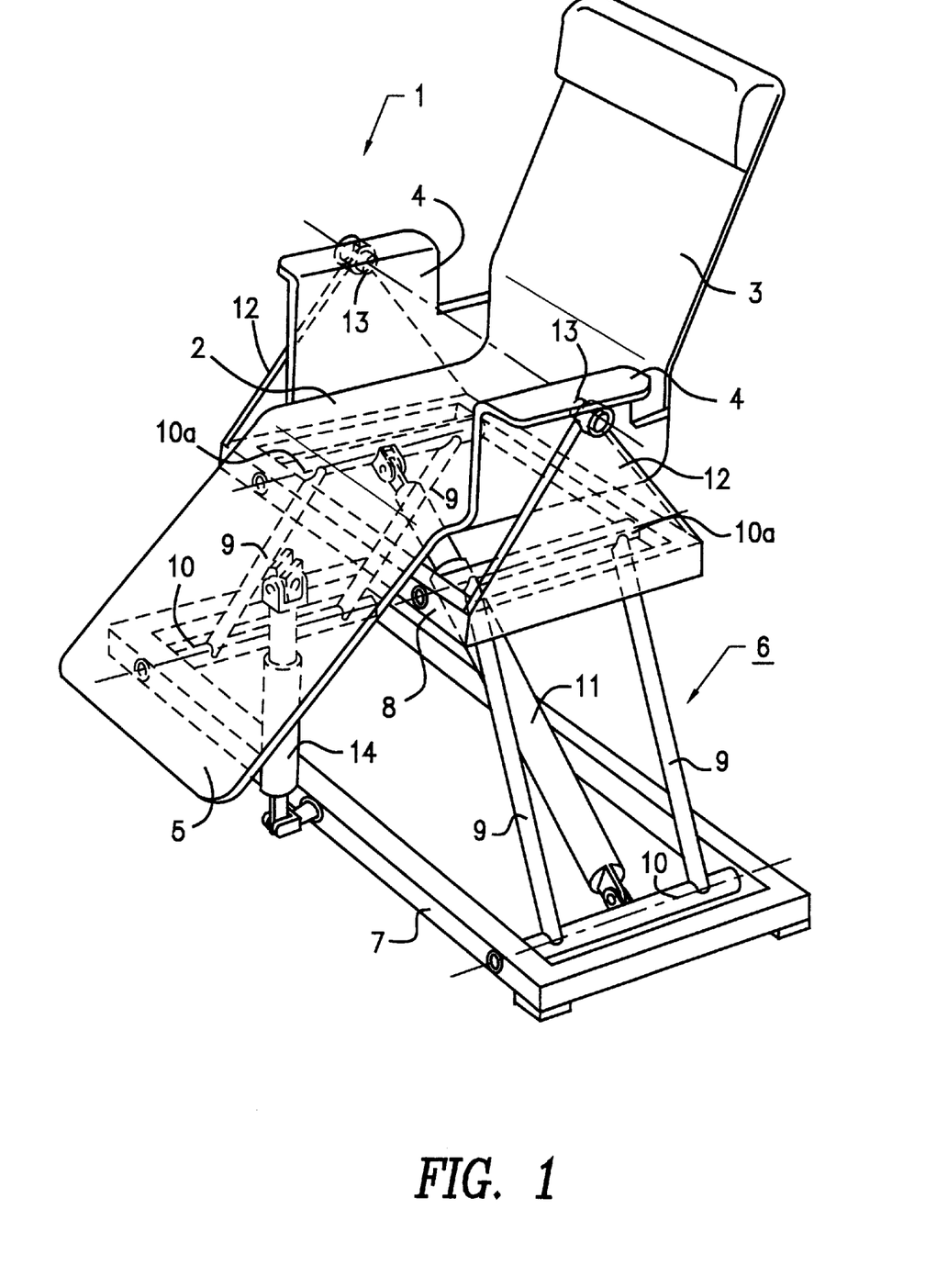
FIG. 1 shows diagrammatically a perspective view of a air assembly according to the invention.

FIG. 1 shows a preferred variant of an embodiment of a chair assembly 1 according to the invention, comprising a chair with a seat 2, a backrest 3, armrests 4, a leg support 5 and a substructure 6. Said substructure 6 is composed of a stationary, i.e. immobile, bottom frame 7 resting on the ground, and a top frame 8 situated above it. The two frames 7, 8 are fixed to each other by means of four connecting arms 9, which are hingedly supported by means of top hinge axes 10a, and bottom hinge axes 10 in the corresponding frames 7, 8. The substructure 6 has the shape of a trapezium, so that tilting movements, which will be explained in greater detail below with reference to FIGS. 5 and 6, can be performed by means of a piston/cylinder unit 11 fixed between the two frames 7, 8. The piston/cylinder unit 11 is in particular pneumatically or hydraulically driven. In order to produce an additional tilting movement of the chair in a plane parallel to the hinge axes 10, 10a, the chair comprising seat 2, backrest 3, armrests 4 and leg support 5 is swivellably supported in upright parts 12 of the chair frame 8. For this purpose, hinge axes 13 of the parts 12 extend into corresponding holes in the armrest 4. The abovementioned swivelling movement, which is achieved by the same type of piston/cylinder unit 14 as the unit 11, will be explained in greater detail below with reference to FIG. 4. The abovementioned swivelling or tilting movement in a plane parallel to the hinge axes 10, 10a can be achieved not only by the construction of FIG. 1, but also by a construction shown in FIG. 7, which will be described later.

Figure 2:
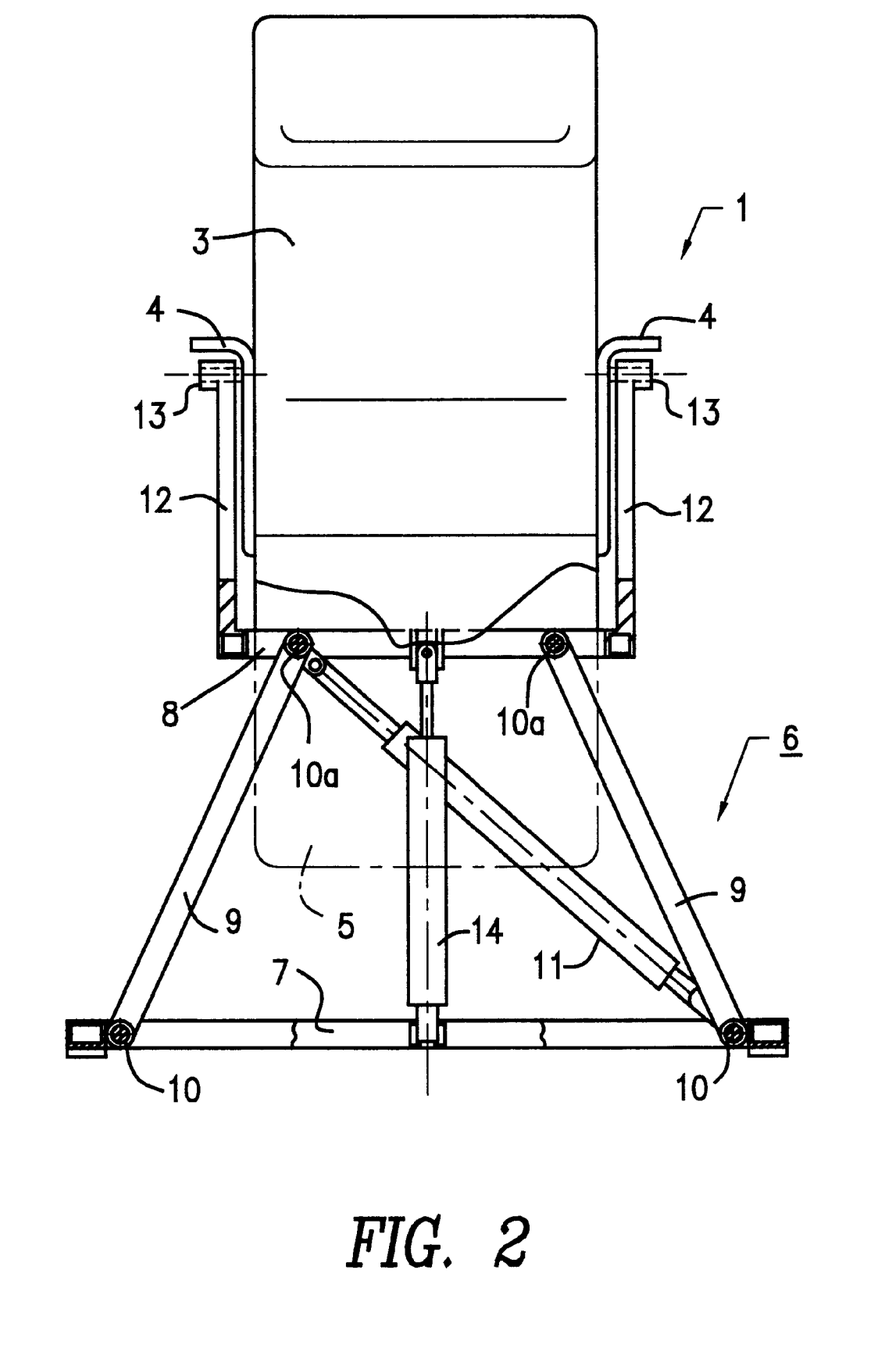
FIG. 2 and FIG. 3 show a diagrammatic front and side view respectively of the chair assembly of FIG. 1.
Figure 3:
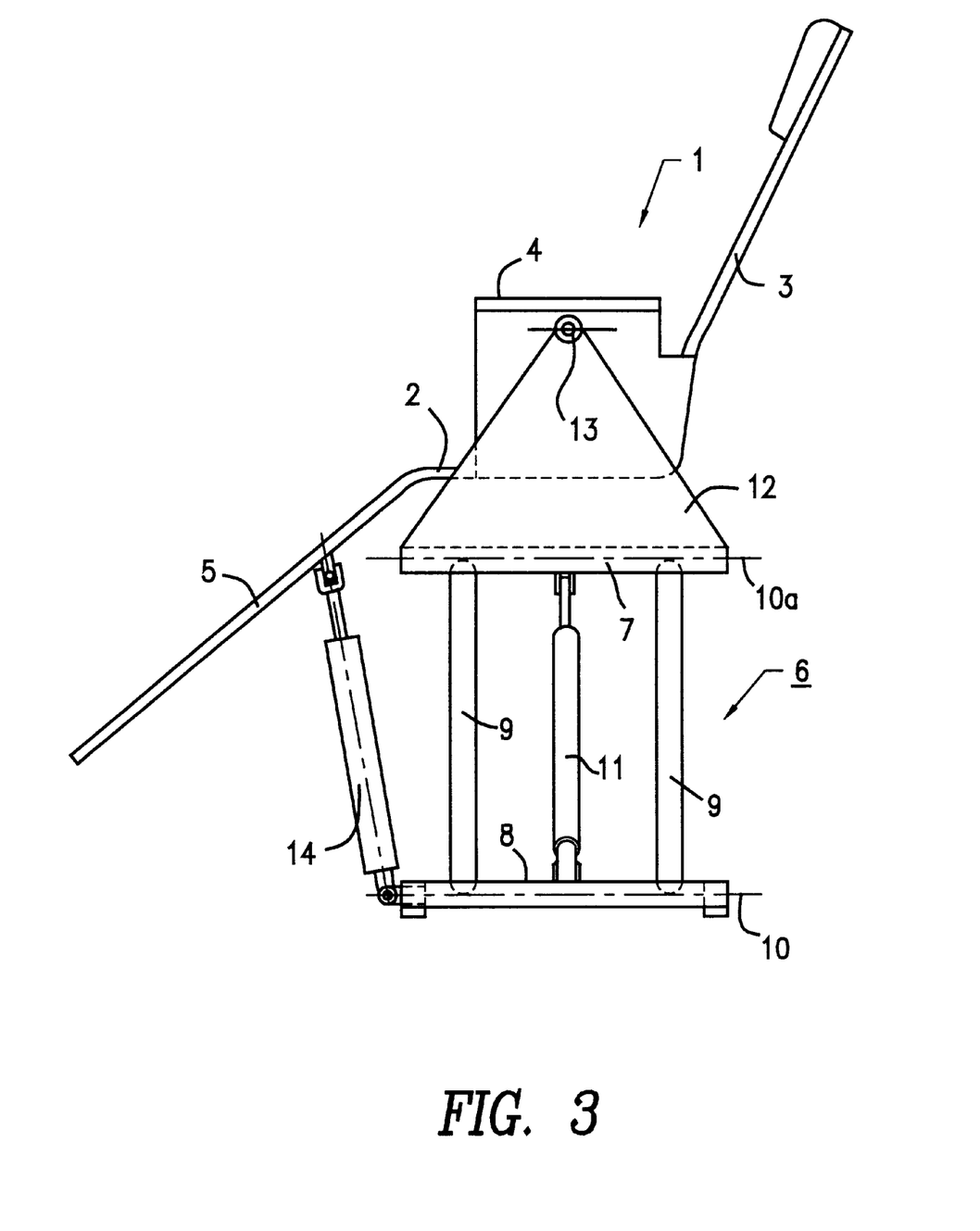

FIG. 2 and FIG. 3 show a diagrammatic front and side view respectively of the chair assembly 1 of FIG. 1, in which parts which correspond to those of FIG. 1 are indicated by the same reference numbers.

Figure 4:
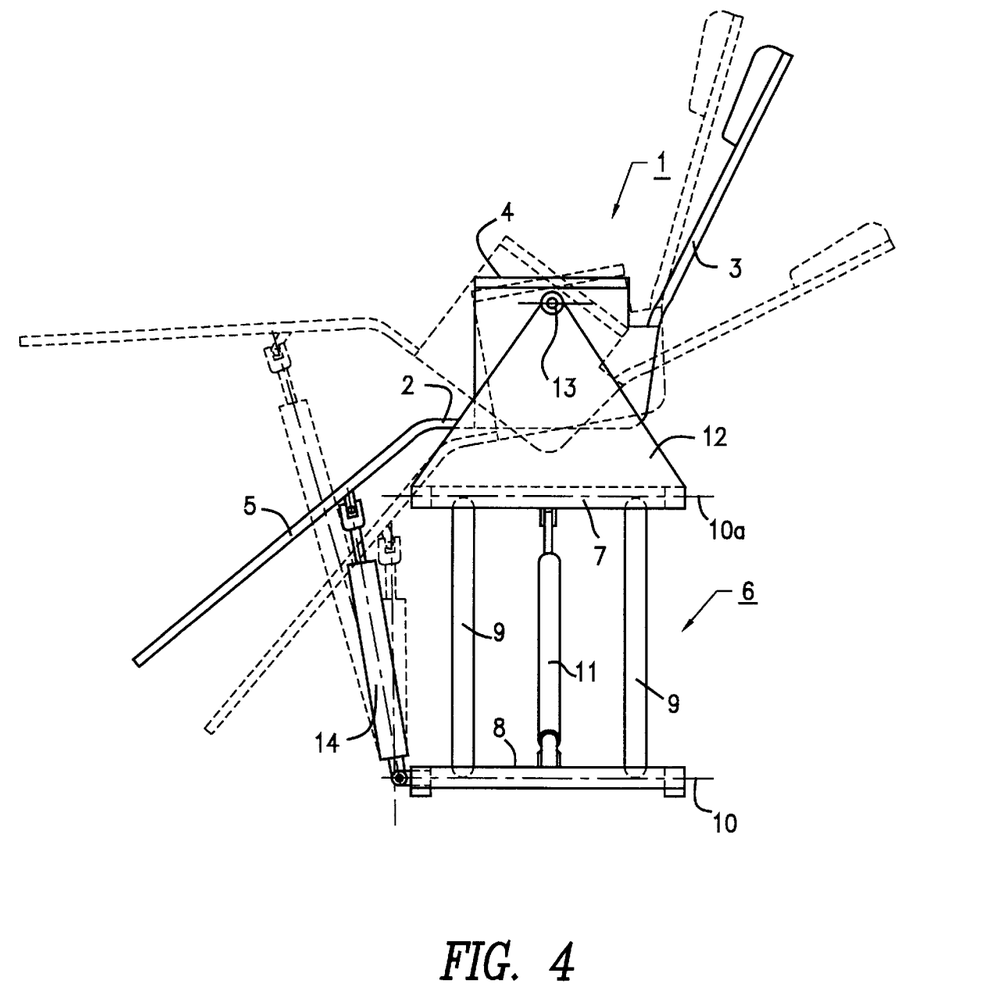
FIG. 4 corresponds to FIG. 3, except that the chair assembly is shown in various positions.

FIG. 4 corresponds to FIG. 3, except that tilting or swivelling movements of the chair comprising seat 2, backrest 3, armrests 4 and leg support 5 are also shown by dotted lines. As shown clearly, said swivelling movement is made possible by the piston/cylinder unit 14, i.e. by the piston sliding into and out of the cylinder.

Figure 5:
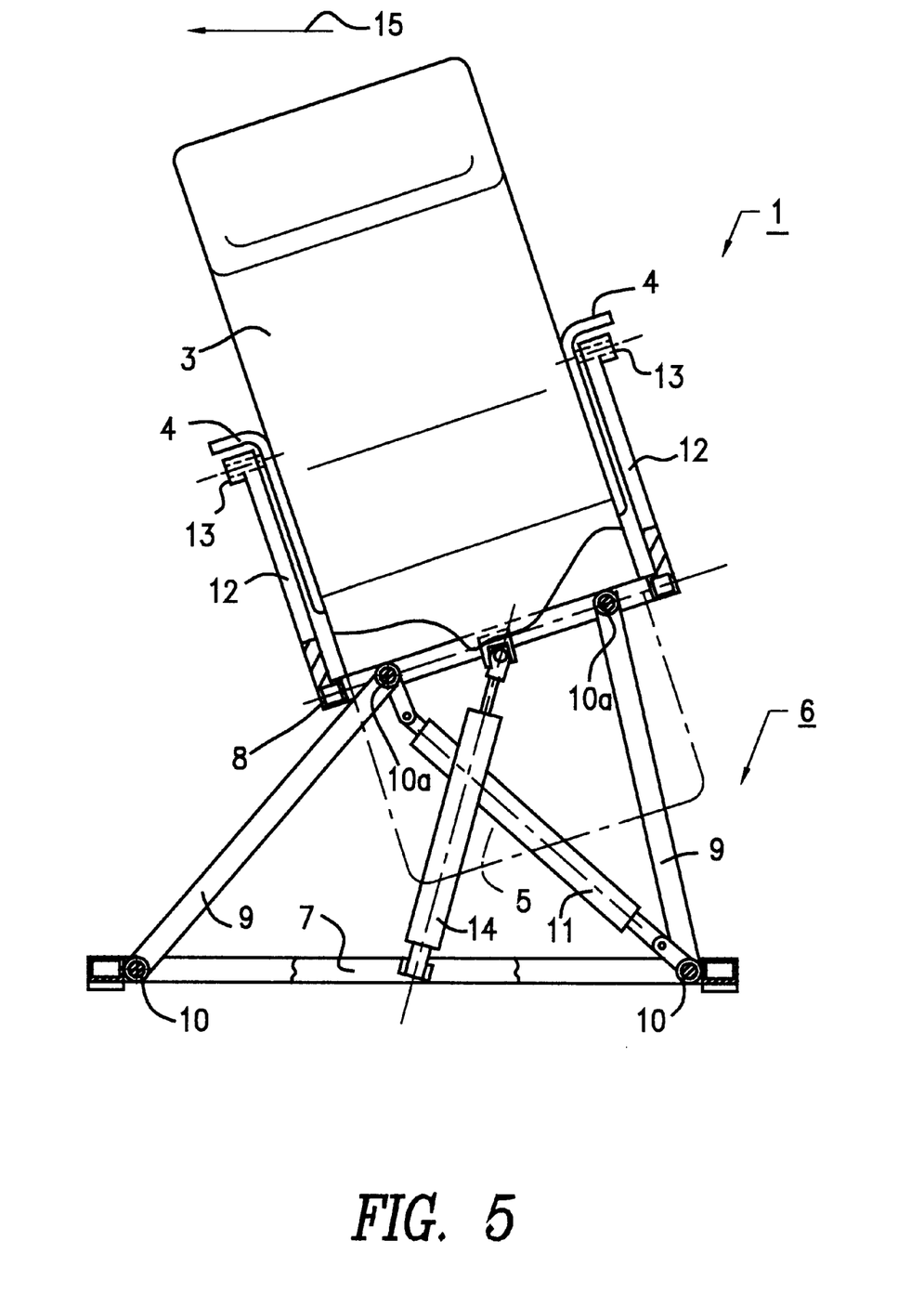
FIGS. 5 and 6 correspond to FIG. 2, wherein various tilting positions of the chair assembly being shown.
Figure 6:
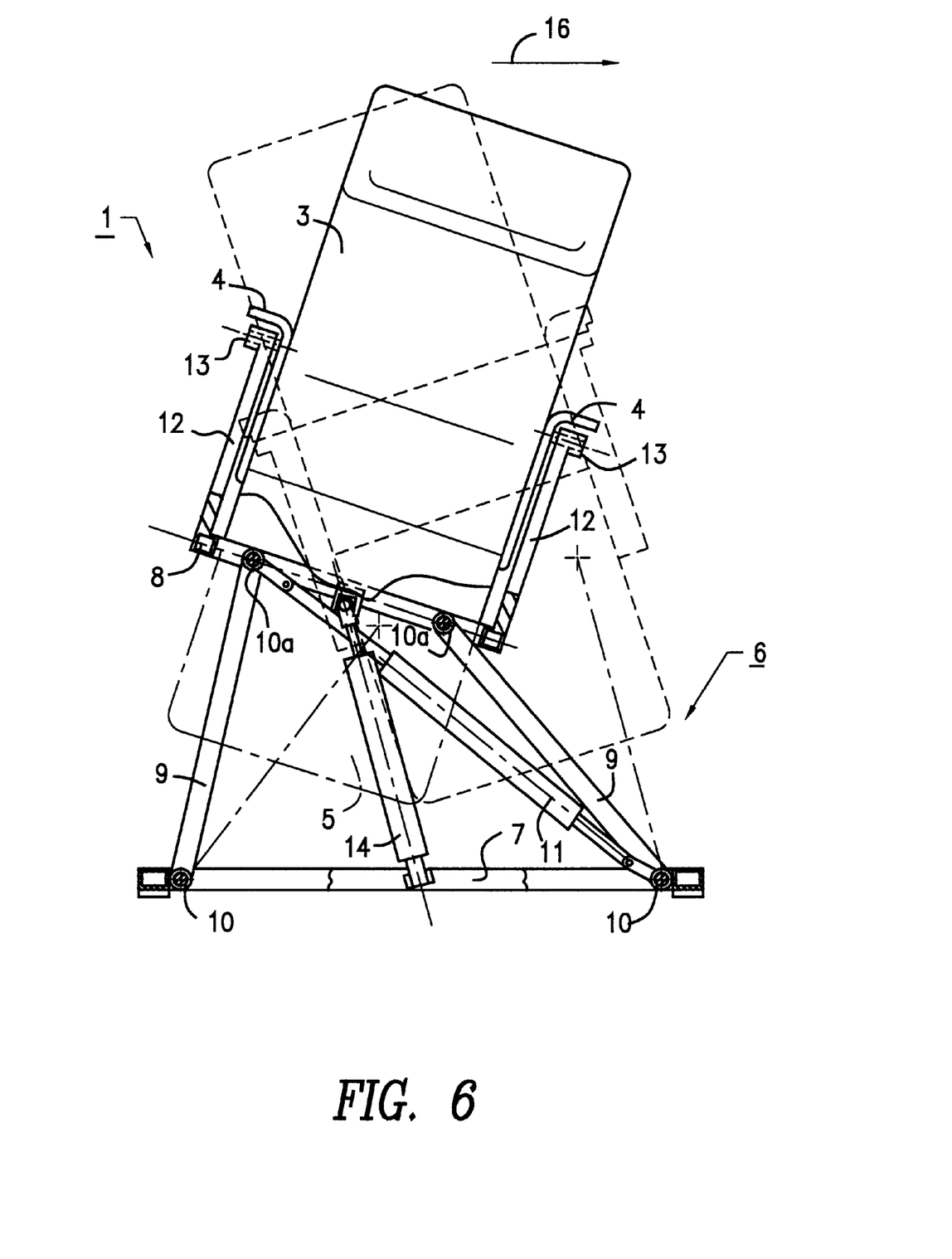

FIGS. 5 and 6 correspond to FIG. 2, but in FIG. 5 the action of the piston/cylinder unit 11 causes a tilting movement in the direction of the arrow 15 (the original trapezium-shaped substructure 6 of FIG. 2 is, as it were, "deformed" in FIG. 5, resulting in the corresponding tilting movement), while in FIG. 6, likewise through the action of the piston/cylinder unit 11, a corresponding, opposite tilting movement in the direction of the arrow 16 is shown. The tilted position shown in FIG. 5 is indicated by dotted lines in FIG. 6.

It will be clear that, in particular through computer-controlled interaction of—in general—the linear actuators 11, 14, a combined movement of, on the one hand, the tilting movement in the direction of the arrows 15 and 16 (by means of the actuator 11) and, on the other hand, the tilting or swivelling movement about the hinge axes 13 (as a result of the actuator 14) which is preferable in the case of virtual reality systems is very efficient, with relatively simple, and therefore cheap components.

Figure 7:
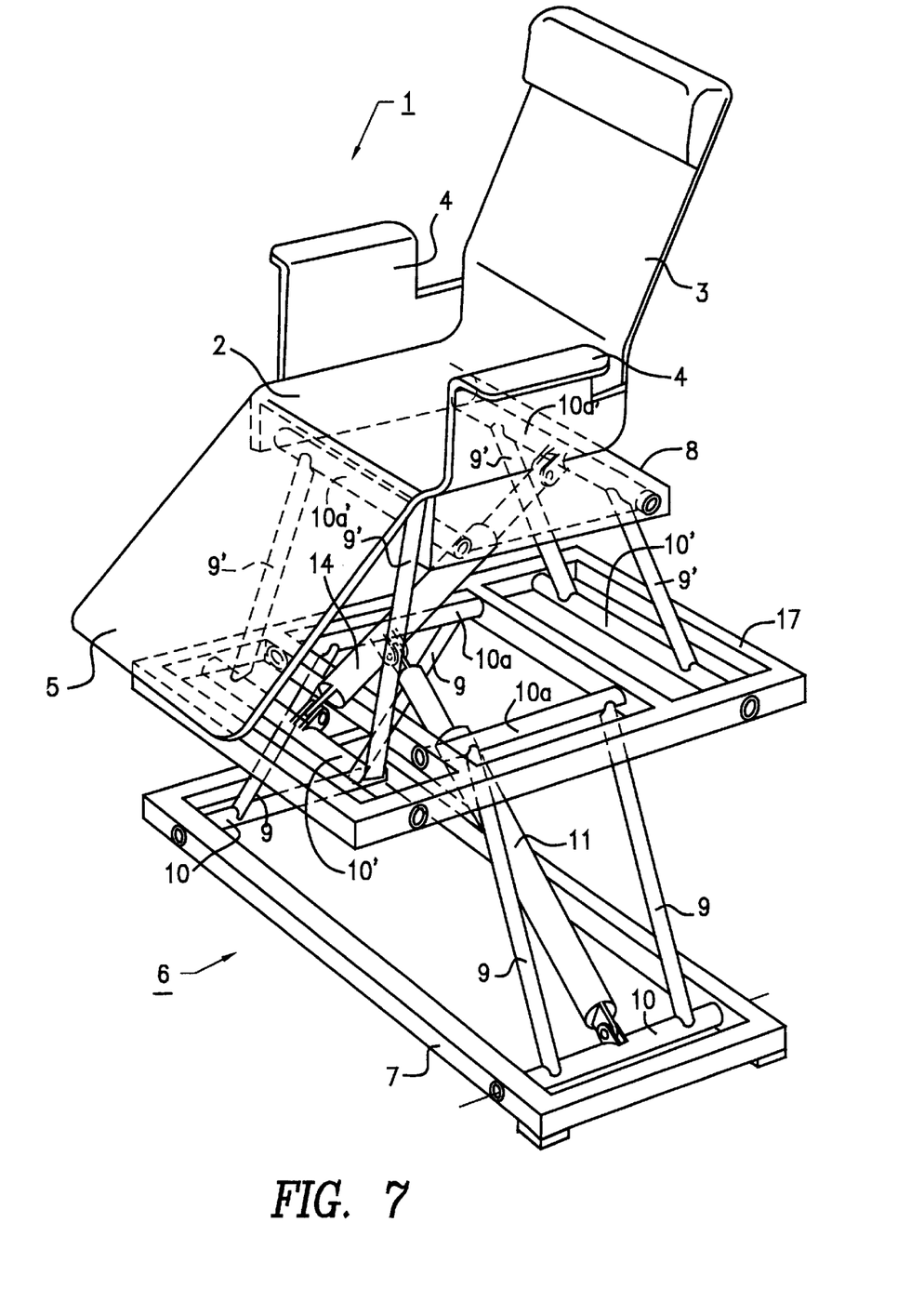
FIG. 7 relates to an embodiment of the chair assembly according to the invention which differs from that shown in FIG. 1.

The construction of FIG. 7 differs from that of FIG. 1 in a different realization of the swivelling or tilting movement of the chair comprising seat 2, backrest 3, armrests 4 and leg support 5 in a plane parallel to the hinge axes 10, 10a. Parts which correspond to those of FIG. 1 are indicated by the same reference numbers. Use is made of an intermediate frame 17 which is situated between the bottom and the top frame and is connected to the bottom frame 7 in a manner corresponding to that of the top frame 8 of FIG. 1. However, the top frame 8 of FIG. 7 is fixed to the intermediate frame 17 by means of connecting arms 9' in such a way that a tilting movement of the chair comprising seat 2, backrest 3, armrests 4 and leg support 5, in a plane parallel to the hinge axes 10, 10a, is possible by means of a swivelling of said connecting arms 9' about bottom hinge axes 10', and top hinge axes 10a mounted in the top frame and the intermediate frame. In fact, the substructure 6 is composed of two trapezia placed at right angles to each other. The distance between the connecting arms 9 in the intermediate frame 17 is therefore greater than that in the top frame 8, just as—as in FIG. 1—the distance between the connecting arms 9 in the bottom frame 7 is greater than that in the intermediate frame 17.

In the constructions according to FIGS. 1 and 7 it is important that the mass centre is situated at abdomen level of a user during use of the unit, which counters motion sickness and ensures that the motion envelope relative to the ground is as small as possible.

The invention is not limited to the embodiments shown in the figures, but also extends to other variants.

What is claimed is:

1. Chair assembly, in particular a chair assembly for use in virtual reality devices, comprising a substructure which comprises a stationary bottom frame and situated above it a top frame bearing a chair, movement means being present between the bottom frame and top frame, in order to make the top frame tiltably move relative to the bottom frame, which movement means comprise two connecting arms of equal and fixed length between the bottom frame and the top frame, which connecting arms fixedly connect hingedly with said top frame by way of two spaced-apart top hinge axes extending adjacent an outer perimeter of the top frame and further fixedly connect hingedly with said bottom frame by way of two spaced-apart bottom hinge axes extending adjacent an outer perimeter of the bottom frame, which top hinge axes and bottom hinge axes extend substantially parallel to each other whereby a distance between the two top hinge axes is less than a distance between the two bottom hinge axes; and drive means, which interact hingedly by way of one of the bottom hinge axes with the bottom frame and hingedly by way of one of the top hinge axes with the top frame, whereby the drive means extend non-parallel to either of the connecting arms.

2. Chair assembly according to claim 1, wherein each of the two connecting arms comprises two parallel arms.

3. Chair assembly according to claim 1, wherein the drive means comprise a linear actuator.

4. Chair assembly according to claim 1, wherein the top frame includes means for tiltably supporting the chair.

5. Chair assembly according to claim 4, wherein the chair is tiltable around an axis extending substantially perpendicular to the top and bottom hinge axes.

6. Chair assembly according to claim 4, wherein said means for tiltably supporting the chair comprises a linear actuator which is connected between the chair and the substructure.

* * * * *

UNITED STATES PATENT AND TRADEMARK OFFICE
CERTIFICATE OF CORRECTION

PATENT NO. : 6,056,362
DATED : May 2, 2000
INVENTOR(S) : De La Haye

It is certified that error appears in the above-indentified patent and that said Letters Patent is hereby corrected as shown below:

Column 2, line 52, "view of a air" should read --view of a chair --.

Signed and Sealed this

Twentieth Day of March, 2001

Attest:

NICHOLAS P. GODICI

Attesting Officer     Acting Director of the United States Patent and Trademark Office